No. 802,150. PATENTED OCT. 17, 1905.
C. NORDSTROM.
CENTRIFUGAL SEPARATOR.
APPLICATION FILED MAY 25, 1905.
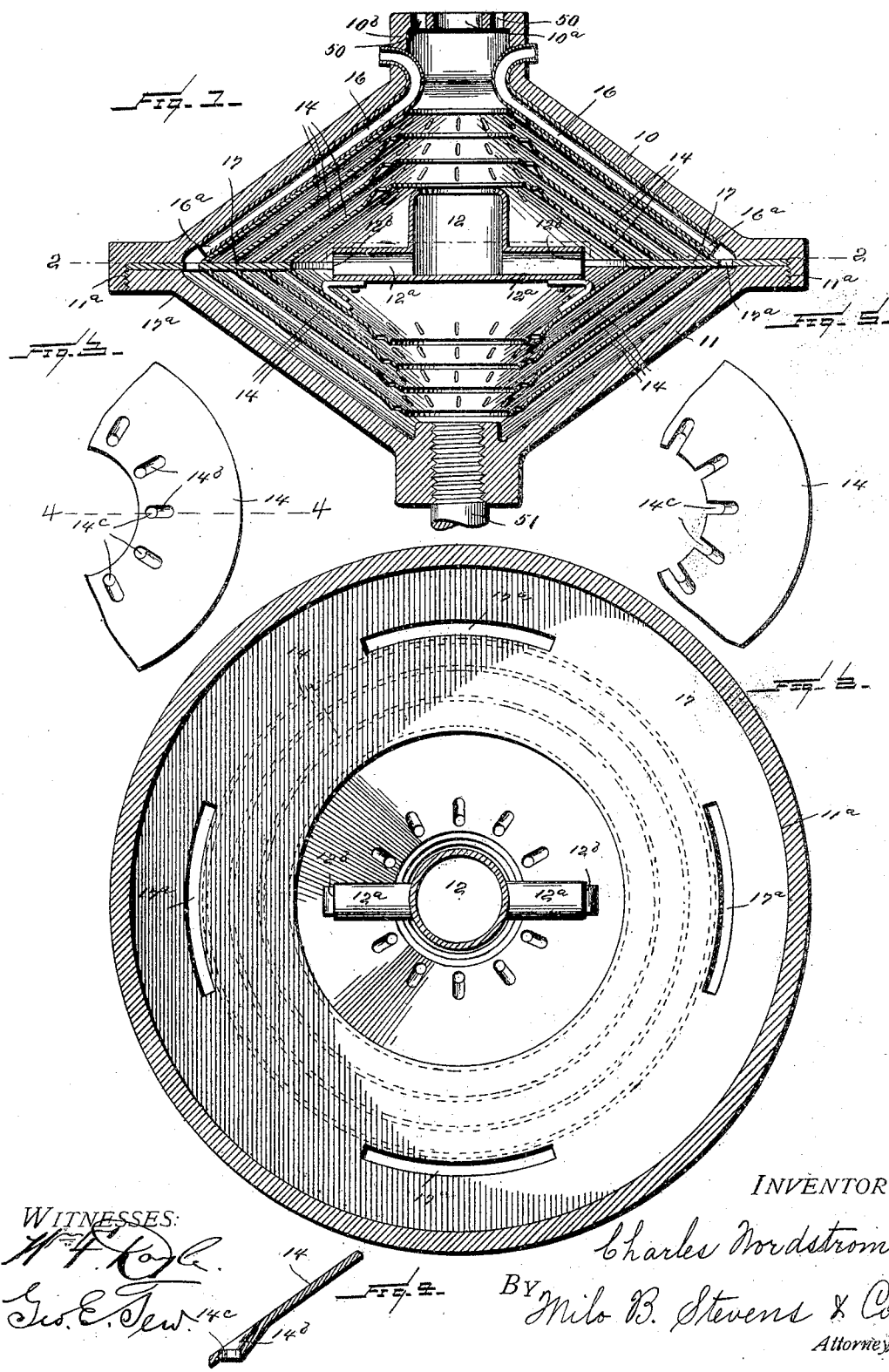
INVENTOR
Charles Nordstrom,
BY Milo B. Stevens & Co.
Attorneys.
WITNESSES:

UNITED STATES PATENT OFFICE.

CHARLES NORDSTROM, OF CHICAGO, ILLINOIS.

CENTRIFUGAL SEPARATOR.

No. 802,150.  Specification of Letters Patent.  Patented Oct. 17, 1905.

Application filed May 25, 1905. Serial No. 262,199.

*To all whom it may concern:*

Be it known that I, CHARLES NORDSTROM, a citizen of the United States, residing at Chicago, in the county of Cook and State of Illinois, have invented new and useful Improvements in Centrifugal Separators, of which the following is a specification.

This invention is a centrifugal separator for liquids, particularly useful as a creamer.

The object of the invention is to form an improved device of the kind utilizing double frusto-conical shells, which are rotated to separate the cream from the milk and to discharge the same separately.

In the accompanying drawings, Figure 1 is a vertical section of the device. Fig. 2 is a horizontal section on the line 2 2 of Fig. 1. Fig. 3 is a detail in plan of a portion of one of the cones. Fig. 4 is a section on the line 4 4 of Fig. 3. Fig. 5 is a similar detail of a modification.

The casing of the separator consists of an upper conical part 10 and a lower conical part 11, which are screwed together at the outer edges, as indicated at 11$^a$. Clamped at its outer edge between the rims of these parts of the casing is an annular plate 17, to which are fastened a series of upper and lower frusto-conical plates 14, which are arranged one within the other on opposite sides of the annular plate, forming a series of double frusto-conical chambers. The milk flows successively from the inner to the outer chambers, and the central upper and lower openings in the plates decrease in size, so that the edges are stepped from the inside toward the outside plate, and it is thereby insured that the milk will flow over the same successively.

At the center of the separator within the plates is a receiving-cup 12, into which the milk is supplied through an opening 10$^a$ at the top of the casing, and this cup communicates, through side pipes 12$^a$, with the innermost plate 14 through holes 12$^b$ at the ends of the pipe. Between the outer plate and the casing are discharge-pipes 16 for the skim-milk, having openings 16$^a$, through which the milk enters, and openings 17$^a$, through which the skim-milk can flow from the space below the plate 17. The pipes 16 lead out through the neck 10$^b$ at the top of the casing, and the inwardly-projecting rim at the head of the neck has holes 50, through which the cream is discharged as it flows up the inside of the neck of the casing. The casing is mounted upon a spindle 51, whereby it is rotated. The edges of the plate around the central openings therein are preferably grooved or corrugated, as indicated at 14$^b$, each groove leading to a hole 14$^c$ near the edge of the plate, as shown in Figs. 3 and 4. If desired, the holes may be omitted and the grooves or corrugations extend to the edge of the plate, as shown in Fig. 5, although the construction with the perforations is considered preferable. The effect of this is to make a cleaner division or separation between the milk and the cream and to prevent the skim-milk mixing again with the cream as it flows over the edges of the plates.

In operation the milk is poured into the cup 12 and by the rotation of the separator is forced out into the first or inner plate. It flows over the upper and lower edges of this plate into the next plate, and so on to the outermost plate. By reason of its lesser specific gravity the cream separates and seeks the central opening, through which it flows upwardly through the neck of the casing and out through the openings 50, from which it may be collected in any suitable manner. The skim-milk is by its greater weight forced to the outer position, and the skim-milk reaching the space between the outer plate and the casing is forced out through openings 16$^a$ and 17$^a$ into the pipes 16 and thence out to discharge.

The device is simple in construction and effective in operation, and the parts may be readily separated for the purpose of being cleaned or otherwise by simply unscrewing the top part 10 of the casing.

What I claim as new, and desire to secure by Letters Patent, is—

A centrifugal separator having a double conical casing formed of two conical parts secured together, an annular plate the outer edge of which is clamped between the parts, double frusto-conical plates mounted, one within the other, upon said annular plate, said conical plates being open at their apexes and the openings being of successively smaller diameters, from the inner plate to the outer plate.

In testimony whereof I have signed my name to this specification in the presence of two subscribing witnesses.

CHARLES NORDSTROM.

Witnesses:
 SIGNA FELTSKOG,
 H. G. BATCHELOR.